United States Patent
Ankeny et al.

[11] Patent Number: 6,139,221
[45] Date of Patent: *Oct. 31, 2000

[54] CONSTANT HYDRAULIC HEAD MOAT AND METHOD FOR CONTROLLING REGIONAL GROUND WATER FLOW

[76] Inventors: Mark D. Ankeny, 760-9 Tramway La. NE., Albuquerque, N. Mex. 87122; Jeffrey R. Forbes, 614 Ridge Pl., Albuquerque, N. Mex. 87106

[*] Notice: This patent issued on a continued prosecution application filed under 37 CFR 1.53(d), and is subject to the twenty year patent term provisions of 35 U.S.C. 154(a)(2).

[21] Appl. No.: 08/920,617

[22] Filed: Aug. 27, 1997

[51] Int. Cl.⁷ .......................... E02B 11/00; E02B 13/00; B09B 1/00
[52] U.S. Cl. .......................... 405/52; 405/43; 405/45; 405/128; 210/170
[58] Field of Search .......................... 405/52, 128, 40, 405/41, 43, 45; 210/170, 747; 52/169.5; 47/25

[56] References Cited

U.S. PATENT DOCUMENTS

| | | | |
|---|---|---|---|
| 862,276 | 8/1907 | Newman | 405/41 |
| 2,362,747 | 11/1944 | Duke | 405/41 |
| 3,159,172 | 12/1964 | Baxter | 405/41 X |
| 4,020,902 | 5/1977 | Valespino | 405/41 X |
| 4,171,921 | 10/1979 | Morfeldt . | |
| 4,288,174 | 9/1981 | Laws . | |
| 4,335,978 | 6/1982 | Mutch . | |
| 4,430,021 | 2/1984 | Wagner et al. . | |
| 4,483,641 | 11/1984 | Stoll . | |
| 4,538,386 | 9/1985 | DiCello | 52/169.5 |
| 4,543,016 | 9/1985 | Tallard . | |
| 4,580,925 | 4/1986 | Matich et al. . | |
| 4,678,369 | 7/1987 | Gliser . | |
| 4,721,408 | 1/1988 | Hewlett | 405/40 X |
| 4,832,122 | 5/1989 | Corey et al. . | |
| 4,908,129 | 3/1990 | Finsterwalder et al. . | |
| 4,992,174 | 2/1991 | Caplan et al. . | |
| 5,080,782 | 1/1992 | Caplan et al. | 210/151 |
| 5,183,355 | 2/1993 | Treat et al. . | |
| 5,192,163 | 3/1993 | Fleming | 405/128 |
| 5,219,243 | 6/1993 | McCoy | 405/43 |
| 5,345,034 | 9/1994 | Corey . | |
| 5,374,138 | 12/1994 | Byles | 405/38 |
| 5,384,048 | 1/1995 | Hazen et al. . | |
| 5,405,225 | 4/1995 | Bilkenroth et al. | 405/129 |
| 5,435,666 | 7/1995 | Hassett et al. . | |
| 5,492,434 | 2/1996 | Adams et al. . | |
| 5,514,279 | 5/1996 | Blows et al. | 210/617 |
| 5,823,711 | 10/1998 | Herd et al. | 405/43 X |
| 5,829,191 | 11/1998 | Gatliff | 47/25 X |
| 5,829,192 | 11/1998 | Gatliff | 405/25 X |
| 5,836,115 | 11/1998 | Clay et al. | 405/43 X |

Primary Examiner—Thomas B. Will
Assistant Examiner—Jong-Suk Lee
Attorney, Agent, or Firm—Zarley, McKee, Thomte, Voorhees & Sease

[57] ABSTRACT

An apparatus and method for controlling ground water flow within a contaminated soil zone. A constant head moat is created surrounding the contaminated volume by digging a trench encircling the volume. A closed loop pipe, slotted or perforated, is laid in the bottom of the trench and serves to cause a constant hydraulic head around the perimeter of the zone. This prevents ground water movement into the zone. An upward gradient is created within the zone by trees, plants or mechanical pumps to move ground water inward and upward. Leaching or movement of contaminants out of the zone is minimized or eliminated.

18 Claims, 4 Drawing Sheets

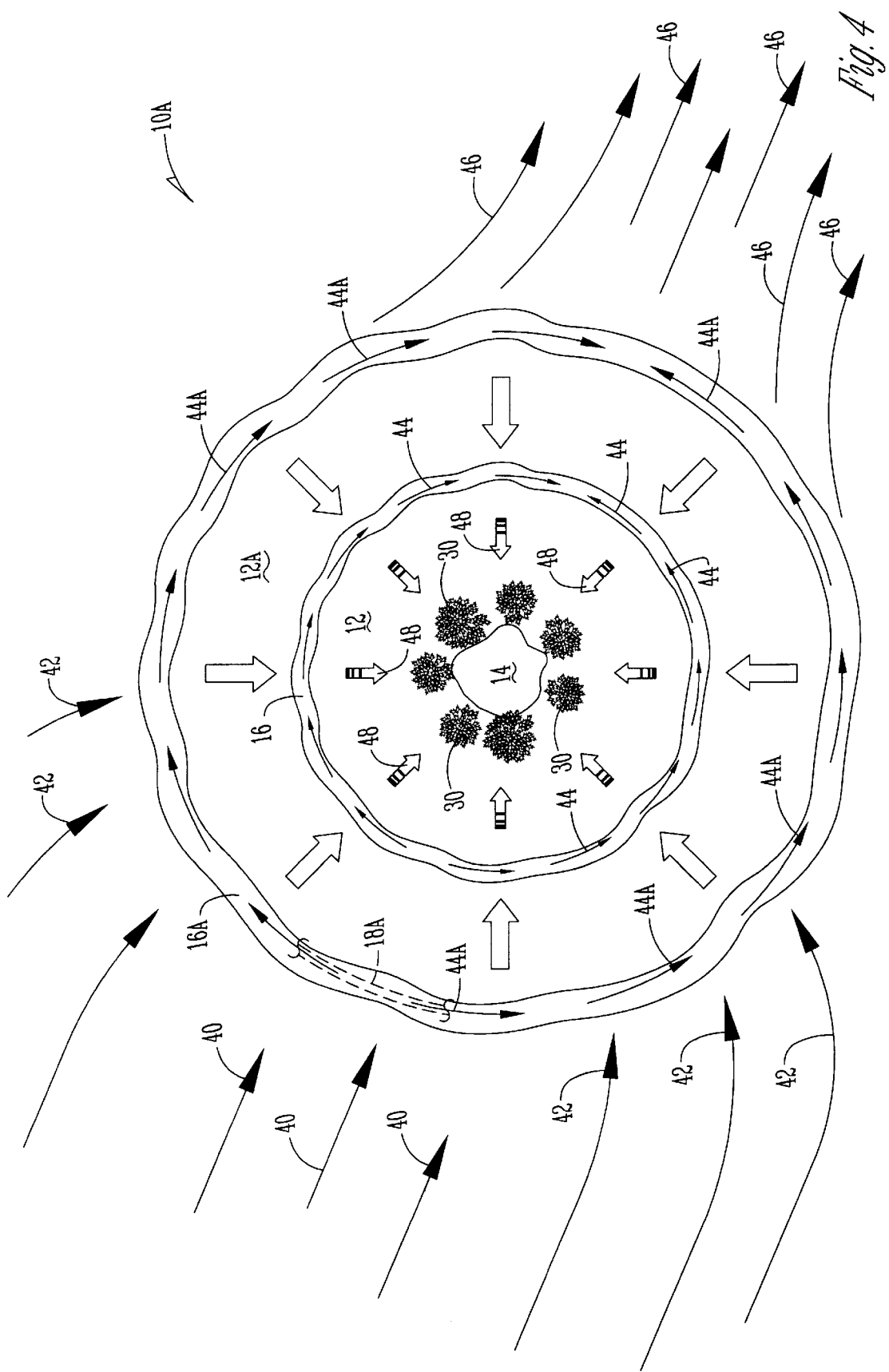

CONSTANT HYDRAULIC HEAD MOAT AND METHOD FOR CONTROLLING REGIONAL GROUND WATER FLOW

BACKGROUND OF THE INVENTION

A. Field of the Invention

The present invention relates to apparatus and methods to deter the leaching or displacement of contaminants in the ground by the flow of ground water, and in particular, to apparatus and methods to control and contain contaminants that exist in the ground at relatively shallow depths.

B. Problems in the Art

The following scenario is illustrative of the problems in the art relative to preventing relatively shallow underground contamination sites from leaching or displacing by ground water flow into human water supplies. An underground oil or septic tank develops a leak and contaminates the ground around it. Normally, there is a natural ground water gradient which causes ground water to flow in a direction through the ground. If left alone, the ground water flow would pass through the volume of contamination in the ground. The advective flow would tend to leach or displace at least some of the contamination and either form a "downstream" underground plume or flow of water/contaminant mixture. This puts at risk any downstream water well or water supply.

Unfortunately, there are reports that conclude there are tens of thousands of relatively shallow contamination sites around the United States that present the risk described above. One way to remedy the situation is to move any well that is possibly in the way of any down gradient leaching or displacement of contaminants or contaminated ground water. However, as can be appreciated, this is very costly and in some situations may not be possible because of limitations on where well placement can be or property ownership issues. Costs on the order of one-million dollars can be involved.

Therefore, solutions to these types of problems are needed. Attempts have been made to address these problems, to both contain and remediate contaminated sites (both the water and the soil). Physical barriers have been used. However, it is difficult over many years and the varied forces that can work under the ground to confidently assume that such barriers will last. Mechanical pumping of ground water out of the contaminated site has been tried. This can be costly and may not stop the ground water from carrying away contaminants. Hydraulic barriers have been attempted. Some utilize impervious layers that encapsulate the contaminated zone. As such, they are costly and difficult to build and maintain because many times they must completely surround the contaminants. No system has been satisfactory. Most either produce at best mediocre containment or control, and/or are expensive to build and operate. Some of the above-mentioned systems are sheet pile cutoff walls, low-permeability bentonite slurry walls, and hydraulic containment via ground water pumping.

There is therefore a need for improved apparatus and methods for control and containment of relatively shallow, in-ground contamination volumes. Attention has turned to solutions that try to control movement of the ground water.

For example, U.S. Pat. No. 4,288,174 to Laws discloses the placement of a sub-surface tile above or below a contaminated area. The patent speaks of attempting to slow the ground water flow by trying to level the water table. It recognizes that in most situations, the regional water table is tilted and has a gradient that causes movement of ground water. The attempt to bring the water table locally to a more level position by use of the tile, or wells, is intended to reduce the hydraulic gradient and thus reduce the flow of ground water through the in-ground contamination. This method does not stop local ground water flow, however.

The Laws patent teaches the reduction of flow through the contaminated volume by flattening locally the water table. It does so, however, only two-dimensionally, in the sense of relying on the flattening of the gradient of the ground water. There is a deficiency in that there remains the tendency of the dissolved contaminants to diffuse outward and away, even if there is a relatively flattened water table locally at the site of contamination. The Laws patent is incorporated by reference herein.

U.S. Pat. No. 4,580,925 to Matich et al. discloses a continuous impervious zone all around a contaminated zone. It also discloses the need for a cover over the zone. It discusses some of the problems in the art and is incorporated by reference herein. It does not address the problem of diffusion of contaminants, even if it tries to hydraulically slow down ground water flow caused by the gradient.

Others have looked to procedures such as natural attenuation, phytoremediation, and ecosystem restoration in conjunction with the problems discussed above. Phytoremediation attempts to use plants to process contaminated ground water. These attempts focus more on remediation and less on dealing with the risk of movement of contaminated ground water.

Cleanup of contaminated aquifers is notoriously difficult, and no single existing technology has proven entirely successful. Technical infeasibility is increasingly being invoked to justify leaving subsurface contaminants in place, especially within industrial areas that will most likely never to used for residential housing. These areas are sometimes called "brownfields". Nevertheless, existing regulations require that further contamination of the down-gradient aquifer be prevented as much as possible, which often necessitates some form of hydraulic control of ground water flow to prevent leaching of contaminants from the "source area."

Some of the reasons that existing technology has not solved the problems and deficiencies in the art are subtle but significant factors involving subsurface water.

Ground water movement is not necessarily completely predictable. The factors that affect it are dynamic. For example, there can be anisotropy within the aquifer. There may be substantial but temporary pulses of ground water caused by distant snow-melts. The water table tends to by dynamic, moving up and down. This affects the strata of soil, namely the unsaturated or vadose zone and the saturated zone. Thus merely looking at local leveling of the water table, such as by the Laws patent, or phytoremediation by plants alone is not a satisfactory more universal solution.

There is therefore room for improvement in the art regarding solutions to the problems with relatively shallow in-ground contamination zones. It is therefore a primary object of the present invention to provide an apparatus and method which controls and contains ground water flow in and around a contaminated zone in the ground which improves on or solves the problems and deficiencies in the art.

Other objects, features and advantages of the invention include:

1. long term hydraulic control;
2. a passive system;

3. economical regarding installation and on-going use;
4. environmentally compatible;
5. flexible in its application and uses;
6. durable and long-lasting integrity
7. low maintenance.

These and other objects, features and advantages of the invention will become more apparent with reference to the accompanying specification and claims.

SUMMARY OF THE INVENTION

The present invention relates to a method and apparatus for emplacement of a constant head moat underneath the ground surrounding the contamination zone or volume. The apparatus uses a closed loop conduit inserted beneath the water table and surrounding the contamination. The loop is water permeable and serves to create a constant head (water level) from side to side of the contamination, which in turn deters any local ground water flow inside the loop. An inward and upward gradient for the local ground water is formed in the contamination zone by utilizing plants, trees and/or pumping towards the center of the zone at the surface. This stops ground water flow through the zone and allows several possibilities regarding containment, treatment and/or remediation of the zone.

The method serves to create a constant head around the contamination for the purpose of deterring local ground water flow in the contamination zone. An inward and upward gradient can be set up in and around the contamination zone. Ground water therein would tend to move up where it could be controlled or removed by any one of several methods. This would control diffusion of the ground water in and immediately around the contamination towards the boundaries of the moat where it might move across or out and be carried by the normal ground water gradient to an undesired location.

BRIEF DESCRIPTION OF THE DRAWINGS

FIG. 4 is a diagram like FIG. 1 illustrating an alternative embodiment utilizing concentric moats.

DETAILED DESCRIPTION OF THE PREFERRED EMBODIMENT

A. Overview

Figure 1:
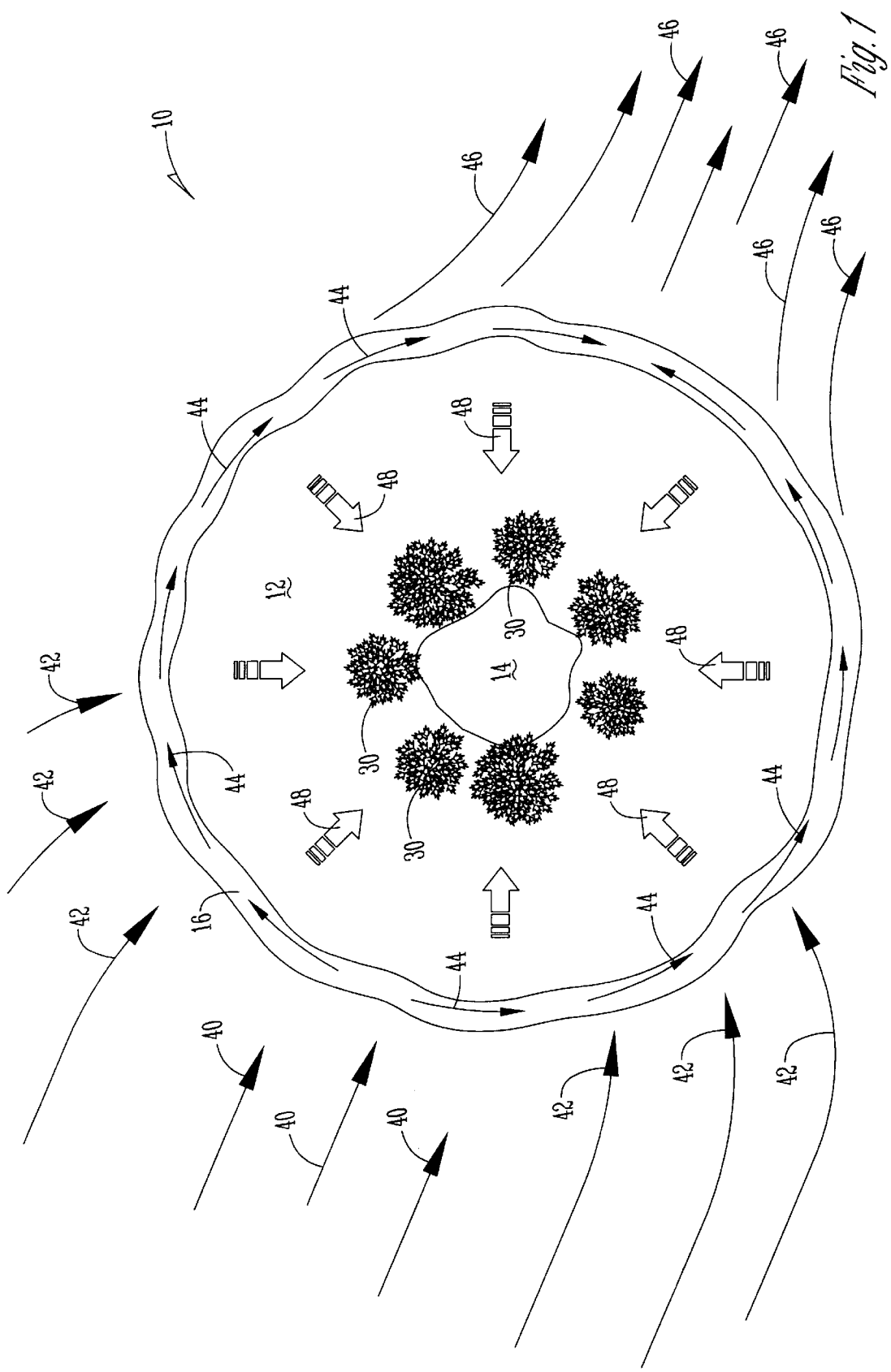
FIG. 1 is a diagrammatical plan view of a contaminated zone in the ground surrounded by a constant head moat according to an embodiment of the present invention.

To better understand the invention, a preferred embodiment will now be described in detail. It is to be understood that the preferred embodiment is not the sole form the invention can take but is merely illustrative.

Frequent reference will be taken to the accompanying drawings. Reference numerals or letters will be used to indicate certain parts and locations in the drawings. The same reference numerals or letters will be used to indicate the same parts or locations in all of the drawings unless otherwise indicated.

B. General Description of Structure

Figure 2:
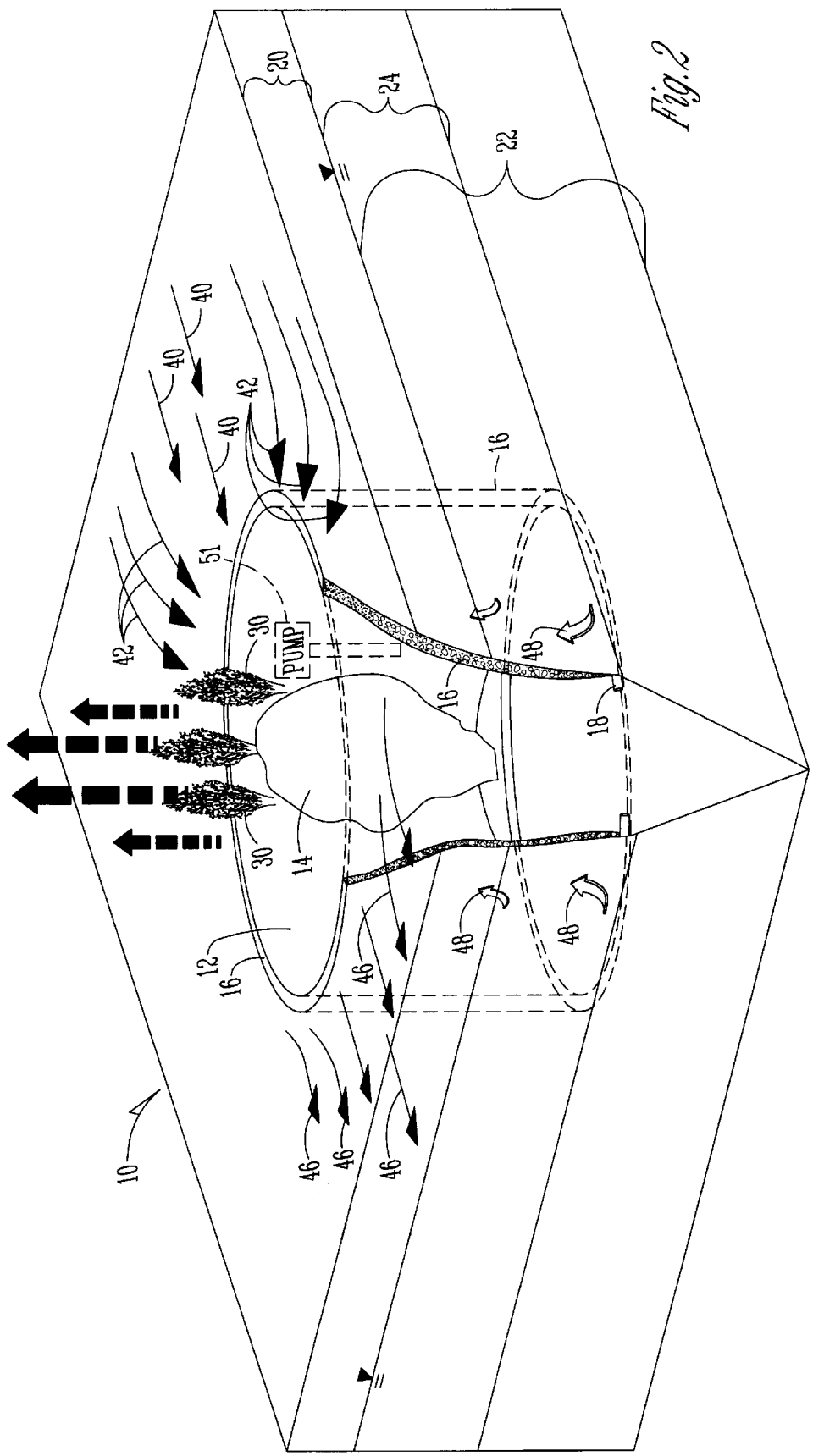
FIG. 2 is a perspective view, partial cut-away diagram illustrating the three dimensional properties of the embodiment of FIG. 1.

FIGS. 1 and 2 illustrate diagrammatically a constant head moat (designated generally at 10) surrounding a volume of ground 12, some of which has been contaminated by contaminants 14. Moat 10 includes a gravel-filled trench 16 which is dug by means known in the art around the volume of ground inside the trench, designated herein by reference numeral 12. Zone or volume of ground 12 is, in this embodiment, essentially a cylinder of soil having a top end at ground level and a bottom end beneath the water table. Trench 16 is dug at a width that is desired. The width and depth can be decided by the general factors associated with the particular soil and application at hand, and is within the skill of those skilled in the art. Presently, there is not known to be any general rule of thumb at selection the width.

The depth of trench 16, on the other hand, is preferred to be to a location under the water table. It is back-filled in the saturated zone of the ground with material of high transmissivity of water. Anisotropy should be considered in determining the depth of backfill.

A pipe 18 is placed in the bottom of trench 16 before being back-filled (FIG. 2). Pipe 18 here is a closed loop of perforated or slotted pipe, such as agricultural tile. The size of pipe 18 can also be selected by the skilled artisan. The teachings of Laws and Matish patents, discussed above and incorporated by reference provide guidance as to the considerations involved.

FIG. 2 also diagrammatically illustrates the general strata beneath the ground. An unsaturated layer 20, sometimes called or including the vadose zone, usually exists at the top of the ground. Underneath layer 20 is generally the saturated layer or zone 22, which underlise the water table 24. Of course the nature and dimensions of these zones vary greatly from site to site, and from time to time, as is known in the art.

Trees 30 are planted inside the ring defined by trench 16. In particular, the trees are positioned generally towards the center of the zone.

C. Examples

An example of a constant head moat is set forth as follows. A ten acre site with surface and subsurface contamination is contributing to a shallow groundwater contaminants plume.

The depth to groundwater is about 8 feet. The plume must be contained and treated and surface contamination covered. The square 10 acre site has a perimeter of 2,640 feet (0.5 mile). Clean soil is excavated from the clean perimeter and used to cover surface contamination on five of the ten acres to a depth of one foot. This requires approximately 8,100 yd$^3$ or 218,000 ft$^3$ of soil. This is equivalent to removing 83 ft$^3$ of soil per foot of perimeter. A dry surface ditch, two feet deep by 40 feet wide can be constructed surrounding the site.

Expensive hauling is minimized. A "constant head moat" is constructed by installing a submerged perforated pipe in a perimeter trench. Due to an essentially zero perimeter gradient, ground water flow within the moat is hydraulically disconnected from ground water exterior to the moat.

The surface ditch provides surface water control to ensure that no run-off occurs from the site. Runoff either evaporates or infiltrates and is pulled inward by the trees. Trenching is performed along the outer edge of the ditch to the depth determined by site hydrogeology. Cottonwood trees or locally favored vegetation are established on and within the ditch. The vegetation creates the inward gradient needed for inward flow.

A simple vegetated moat design can improve hydraulic containment and cleanup of contaminants in shallow groundwater systems in New Mexico and similar semiarid environments. In that climate, evapotranspiration is far in excess of rainfall. With the proper vegetation we can use evapotranspiration to pump contaminated groundwater.

With the proper subsurface plumbing we can minimize the pumping of clean groundwater. With the proper combination of vegetation and plumbing, vegetation, by itself, can pump enough water to control and clean up a contaminant plume.

Pumping within the moat could be used initially to ensure containment prior to establishment of an adequate annual or seasonal evaporative demand.

C. Operation

Operation of the invention is as follows. Normally, significant hydraulic gradients exist across and through the ground, including volume 12. FIGS. 1 and 2 illustrate by arrows 40 the normal regional ground water flow created by the existing natural gradient in the ground. It is generally uniform in direction.

If allowed to operate naturally, ground water flow 40 would pass right through contaminated zone 14 and carry contaminants away where they might find a drinking water well or otherwise be ecologically damaging or put humans and animals at risk.

To avoid this result or risk, a constant head moat is installed in the ground. Trench 16 is dug. Pipe 18 is placed in the bottom of trench 16. Gravel is back-filled into trench 16. In this case the backfilling is up through saturated zone 22 and essentially to the surface of the ground.

Because the pipe has a very high hydraulic conductivity, the hydraulic head (water level) becomes nearly constant at all points along the perimeter pipe 18. Whereas significant hydraulic gradients ordinarily exist across the encircled zone, resulting in ground-water flow through the contaminated soil and development of a down-gradient contaminated ground-water plume, the presence of moat 10 eliminates ground-water flow through zone 12 within the moat. The leveling of the hydraulic gradient precludes advective transport of ground-water. Additionally and importantly, the much slower diffusion of contaminants toward the perimeter of moat 10 is countered by ground-water withdrawal from the middle of the encircled zone 12, here by evapotranspiration by trees 30 or other plants within moat 10. The trees 30 and/or plants actually direct ground-water flow within moat 10 inward from the perimeter drain (trench 16) to the center of the site, and then upward. Therefore, moat 10 does not simply create a leveling of the water table at contaminated zone 14, but creates a constant head around zone 14 and inside creates an inward and upward gradient.

This is essentially a three-dimensional gradient, and will address not only ground water movement in zone 14, but further compels movement in zone 14, both horizontally and vertically. Moat 10 basically creates a "dimple" in the water table, and an inward and upward flow of ground water.

Trench 16 with pipe 18 and the backfill is the physical equivalent of a subsurface moat. In a traditional moat, the free water surface surrounding a site is at uniform potential and no gradient exists for water flow. Lack of a surface expression of free water does not affect this reality. Thus, a subsurface moat can be used to eliminate advective ground water movement through a contaminated soil zone.

This "gradient leveling" approach used has the unusual characteristics of lacking an inlet, an outlet or a gradient in this closed loop configuration. The perforated pipe 18 is installed below the water table and back-filled in the saturated zone 22. The presence of the buried pipe 18 ensures the head differences between one side of the moat and the other cannot exist.

Unlike cutoff walls or slurry walls, the moat 10 completely eliminates groundwater hydraulic gradients across the area encircled by the moat, therefore no tendency for ground water flow exists. Unlike mechanical pumping to establish hydraulic capture, the moat 10 is a passive system that requires no energy to operate.

FIGS. 1 and 2 show by arrows 42 that ground water approaching the vicinity of moat 10 would be attracted to the high transmissivity trench and gravel 16. Arrows 44 (inside trench 16) illustrate that the water would follow trench 16 around zone 14. It would then leave and continue in the direction the regional ground water flow (arrows 46).

As stated above, inside moat 10 there is an equalized pressure head created by pipe 18 which deters any advective ground water flow along the regional ground water path. Arrows 48 in FIG. 1 show an inward radial gradient is established within moat 10 to offset diffusional transport. Arrows 48 in FIG. 2 show how trees 30 create an upward and inward gradient. Thus down-gradient migration of subsurface contaminants in ground water from contaminated zone 14 is prevented.

Containment and remediation of groundwater contamination consume enormous resources. Many of our standard engineering tools provide only mediocre containment and economically ineffective remediation. This realization has led to a strong interest in such general topics as natural attenuation, phytoremediation, and ecosystem restoration. It has also led to the more specific objective of designing a system capable of containing and remediating contaminated shallow ground water sites.

The moat system according to the preferred embodiment includes three elements: (1) the local groundwater flow is eliminated by encircling the site with a closed loop of perforated pipe emplaced below the water table (e.g., agricultural drainage tile); (2) groundwater flow within the loop is directed inward by using vegetation and/or pumping to cause water to flow from the perimeter drain towards the center of the site; and (3) the vadose zone is used for transient water storage and treatment.

Anisotropy should be considered in determining the depth of the trench and back fill. In areas with large seasonal water table fluctuations, feeder or bleeder lines may be needed to maintain a constant water table and hydraulic control of a contaminated site. Water flow also can be manipulated by the use of concentric moats.

Gradient leveling, where applicable, is inexpensive. Agricultural drainage tile (perforated pipe) is used widely on farms around the U.S. Flexible perforated 4" black plastic pipe is readily available in spools of 2900 feet. The pipe can be purchased and installed for less than $1.50/ft to a depth of seven feet. Equipment is also available for deeper installation.

Gradient leveling may also be used in conjunction with drains. Water head in the moat can be manipulated, as desired, using a simple standpipe of adjustable height that overflows into a standard subsurface drain pipe. This combination will likely be the most practical configuration.

Element (2) of the design harnesses transpiration to provide an inward hydraulic gradient to offset outward contaminant diffusion. Absence of a local ground water gradient greatly reduces performance requirements placed upon the vegetative cover. The effectiveness of transpiration-driven hydraulic control is dependent upon vegetation, climate, hydraulic properties, and system scale. Riparian plants, such as cottonwood (Populus spp.), can transpire enormous volumes of water. Rainfall, potential evapotranspiration, and seasonal minima in transpiration will provide limits to system performance.

Element (3) is the optional use of the vadose zone for storage and treatment of groundwater. Plants transpire water from the vadose zone and capillary fringe during the growing season. This zone slowly refills over the course of the winter and removes water from the underlying water table. Subsurface irrigation, in conjunction with well pumping, also can be used to fill the vadose zone for hydraulic control during winter and for increased transpiration during the growing season. Use of the vadose zone for storage and treatment can significantly reduce pump and treat costs.

Conductivity and storage characteristics of both the aquifer and vadose zone will determine the groundwater gradient established within the moat, and will determine whether an adequate inward gradient can persist through seasonal fluctuations in the annual water balance. Larger sites have a larger evapotranspiration area and vadose zone volume to perimeter ratio. This larger ratio will result in persistence of larger gradients through seasonal variations.

Phytoremediation can be an intrinsic component of a moat design. For sites with metals contamination, trees not only can maintain the desired inward gradient but also provide long-term storage of contaminants as dissolved metals are incorporated into woody tissues. In addition, organic compounds typically show increased degradation rates in the presence of plant roots.

Although an intrinsic design component, phytoremediation may or may not be important at a given location. Diffusional processes or desorption kinetics may be more limiting. Thus, phytoremediation may provide only marginal performance improvement over pump and treat. However, because of the longer cleanup times in these locations, plants may be even more important in reduction of long term hydraulic control and treatment costs.

E. Options and alternatives

It will be appreciated that the present invention can take many forms and embodiments. The true essence and spirit of this invention are defined in the appended claims, and it of this invention are defined in the appended claims, and it is not intended that the embodiment of the invention presented herein should limit the scope thereof.

The example of gravel for the backfill in trench 16 has been given above. Other types of high or relatively high water transmissivity materials can be used.

Additionally, the dimensions of moat 10 can widely vary. The invention is applicable to areas of relatively small size to very large areas (several acres or more).

One alternative to use of trees 30, or plants, is the use of mechanical pumping (see reference number 51 in FIG. 2) of water from the center of zone 12. Mechanical pumping can also be used with trees or plants.

Figure 3:
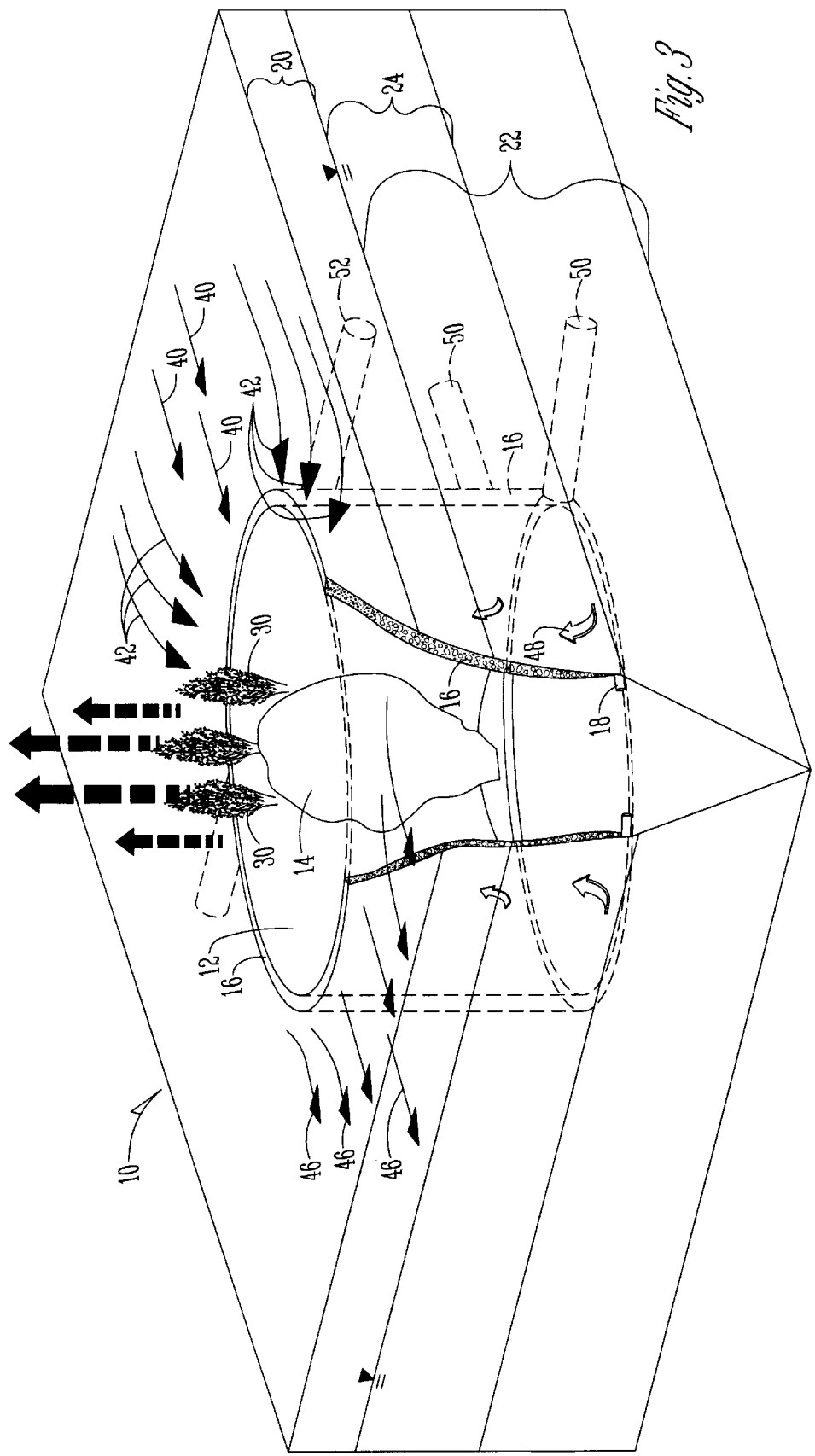
FIG. 3 is a diagram like FIG. 2 illustrating optional feeder or bleeder lines connecting into the moat.

FIG. 3 illustrates two optional features that can be used with moat 10. There are situations where a pulse or excess of ground water, relative to normal conditions, would raise the water table inside the zone 12 to the point where it might compromise control over the gradient or movement of water in zone 12. If indicated, what will be called an intercept, cut-off or bleeder pipe 50, can be buried in the ground up-gradient from zone 12 and trench 16. Pipe 50 would serve to assist in diverting the excess water or pulse away from zone 12 to deter the problem discussed above. Pipe 50 can be the same or similar to pipe 18. An example, again, would be conventional agricultural drainage tile.

Conversely, there are times when the water table may drop to a point that comprises the ability to control the gradient in zone 12 with moat 10. In those instances, what will be called feeder pipes 52 (one or more) could be placed in communication with pipe 18. One example would simply be to have pipes (e.g. agricultural tile) extending radially from pipe 18. Pipes 52 would serve to draw in additional water an feed it into moat 18, where the gradient inside zone 12 would pull it in and maintain the local water table in a desired range.

For example, there may be seasonal changes that cause the water table to rise (e.g. rainy season or snow melt) that could use the bleeder pipe(s) 50, and cause the water table to drop (e.g. non-rainy season or no-snow melts) that could use the feeder pipe(s) 52. Another example is where in the growing season, plants would naturally transpire ground water, and lower the water table versus the winter when there would be no transpiration and the water table would rise. Note too that the present invention could be used advantageously to manipulate water within zone 12. For example, water could be stored in the unsaturated zone 20 by pulling it up with the upward gradient.

FIG. 4 shows a still further option for moat 10. A gravel filled concentric trench 16A could be placed around trench 16, and include a pipe 18A in its bottom. Concentric moat 10A could be used for such things as assisting in treatment or remediation of the soil in zone 12. For example, a soil treatment could be introduced in zone 12a (the volume between trenches 16 and 16A) and by the gradient pulled through trench 16 into zone 12, and up through contamination zone 14. Transpiration would work with the treatment to remediate or treat the soil in zone 12. Pipe 18A and trench 16A would assist in diverting the regional ground water flow around moat 10A and moat 10 as previously described. Arrows 44A show water flow in trench 16A similar to the flow in trench 16.

What is claimed:

1. An apparatus for controlling regional ground water flow through a zone at least partially below the water table comprising:

a closed loop of high transmissivity conduit placed in a trench including a relatively high transmissive medium and positioned underneath the water table and encircling the zone;

the conduit maintaining a constant hydraulic head around all sides of the zone and controlling lateral ground water gradient which controls localized ground water movement in the zone;

a component placed relative to the zone to create an inward or upward gradient within the zone to control vertical ground water gradient which controls diffusion of the ground water in or to the boundaries of the zone and to draw the ground water within the zone inward or upward.

2. The apparatus of claim 1 wherein the conduit is a slotted or perforated pipe.

3. The apparatus of claim 2 wherein the pipe is agricultural tile.

4. The apparatus of claim 1 wherein the medium is gravel.

5. The apparatus of claim 4 wherein the component is one or more plants.

6. The apparatus of claim 5 wherein the one or more plants comprising one or more trees.

7. The apparatus of claim 1 wherein the component is a pump.

8. The apparatus of claim 1 wherein the component comprises one or more plants and one or more pumps.

9. The apparatus of claim 1 further comprising a bleeder conduit placed at a spaced apart position from the trench to assist in diverting ground water from the zone.

10. The apparatus of claim 1 further comprising a feeder conduit in fluid communication with the trench to assist in bringing additional water to the zone.

11. The apparatus of 10 wherein the feeder conduit extends generally radially from the trench.

12. The apparatus of claim 10 further comprising a plurality of feeder conduits in fluid communication with the trench.

13. The apparatus of claim 1 further comprising a generally concentric second conduit surrounding the conduit.

14. The apparatus of claim 13 further comprising a second generally concentric trench surrounding the trench and containing the second conduit.

15. A method for controlling regional ground water flow through a zone at least partially in the water table in the ground, the method comprising the steps of:

maintaining a constant hydraulic pressure head around the perimeter of the zone to control lateral ground water gradient which controls localized ground water flow;

by placing a closed loop of high transmissivity conduit in a trench including a relatively high transmissive medium and positioning the conduit below the water table encircling the zone and creating an inward or upward gradient inside the zone with a component to control vertical ground water gradient which controls diffusion of ground water in or to the boundaries of the zone and to draw the ground water within the zone inward or upward.

16. The method of claim 15 wherein the step of creating the inward or upward gradient with the component comprises utilizing plants positioned towards the top center of the zone to pull up water and transpire water.

17. The method of claim 15 wherein the step of creating the inward or upward gradient with the component comprises mechanically pumping water from generally the center top of the zone out of the zone.

18. The method of claim 15 further comprising storing water in the zone above the water table by pulling water from below the water table upward.

* * * * *